Jan. 20, 1970   G. G. RITTENHOUSE   3,490,695
AGRICULTURAL SPRAYING MACHINES
Filed Feb. 13, 1967   3 Sheets-Sheet 1

INVENTOR.
GLEN G. RITTENHOUSE
BY Church & Rogers
PATENT AGENTS

Jan. 20, 1970     G. G. RITTENHOUSE     3,490,695
AGRICULTURAL SPRAYING MACHINES
Filed Feb. 13, 1967     3 Sheets-Sheet 2
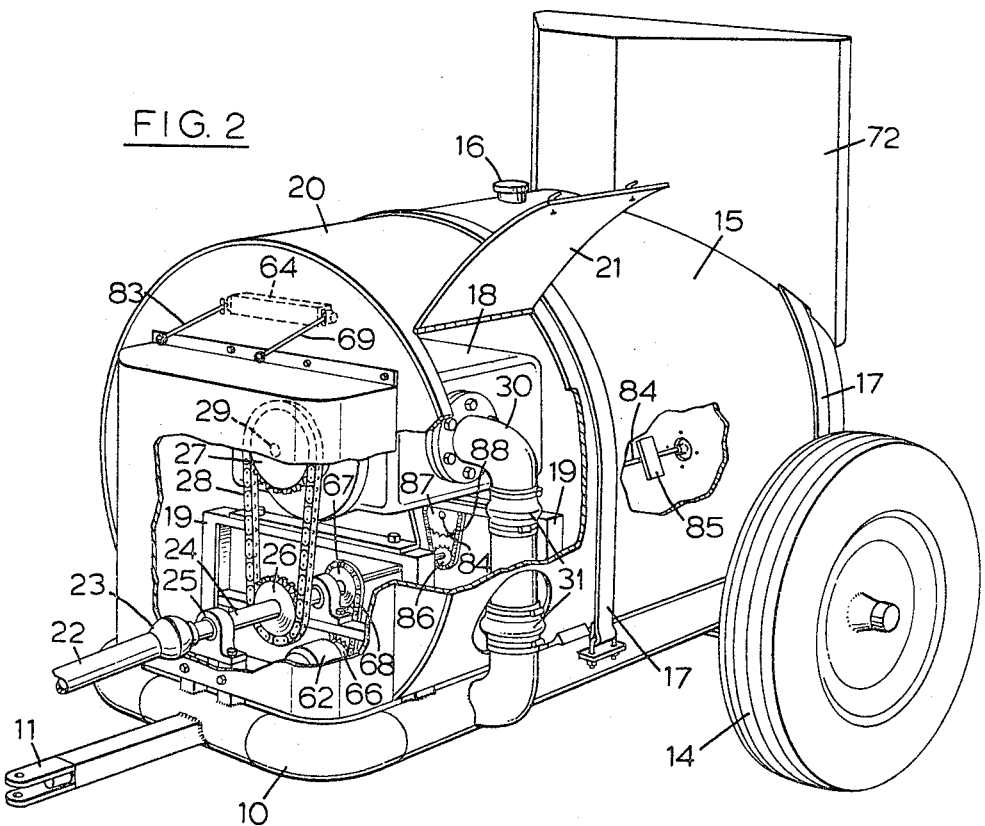
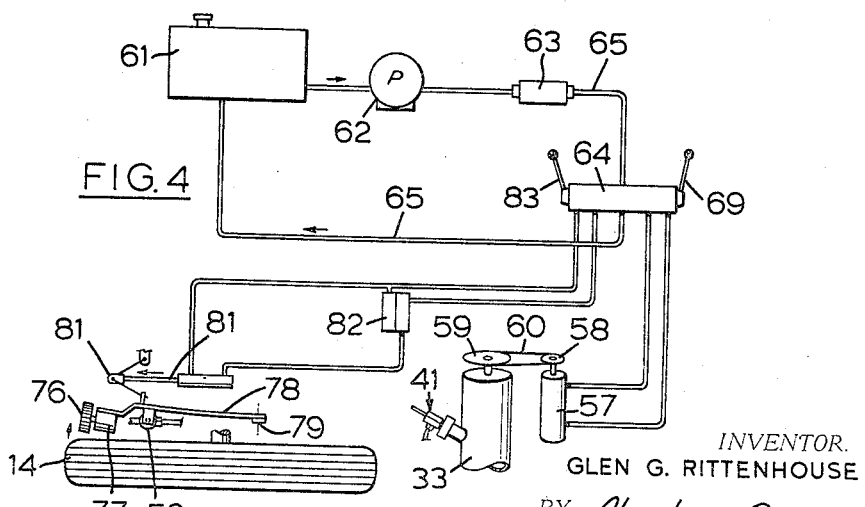
INVENTOR.
GLEN G. RITTENHOUSE
BY *Church & Rogers*
PATENT AGENTS Jan. 20, 1970     G. G. RITTENHOUSE     3,490,695

AGRICULTURAL SPRAYING MACHINES

Filed Feb. 13, 1967                       3 Sheets-Sheet 3

*INVENTOR.*
GLEN G. RITTENHOUSE

BY *Church & Rogers*

PATENT AGENTS

United States Patent Office 3,490,695
Patented Jan. 20, 1970

3,490,695
AGRICULTURAL SPRAYING MACHINES
Glen G. Rittenhouse, Jordan Station, Ontario, Canada
Filed Feb. 13, 1967, Ser. No. 615,591
Int. Cl. A01n *17/08;* B05b *7/32;* B05c *5/00*
U.S. Cl. 239—77         6 Claims

ABSTRACT OF THE DISCLOSURE

An agricultural crop spraying machine able to operate with highly concentrated solutions atomises the liquid by the use of an air stream of high velocity and low flow rate. Other features are the provision of a special nozzle construction, a sprayer frame in the form of an endless loop tube constituting a plenum for the high pressure compressor, and the provision of a safety device to stop the spraying while the vehicle is stationary.

BACKGROUND OF THE INVENTION

This invention relates to agricultural spraying machines for the spraying of crops with liquids in the form of a fine mist or spray, and in particular to orchard and row crop spraying machines.

DESCRIPTION OF THE PRIOR ART

In order to achieve maximum efficiency and economy in crop production it has become essential to spray at regular intervals in order to apply fertilizer, and also for control of various diseases and insect pests. In the most common spraying machines known and used hitherto a large-volume, low-pressure air stream is generated by a large fan and this stream is directed towards the crop; at the same time the liquid to be sprayed is supplied at high pressure to spray generating nozzles so disposed that the emerging spray is entrained in the air stream and carried thereby on to the crop.

There are several excellent reasons for the use of as high a solution concentration as possible, for example, to conserve the need for water, to give as long a spraying time as possible for each filling, and the fact that some control chemicals are more potent at higher concentration. In the known machines referred to above the concentration that can be used is severely limited, since at high ambient temperatures the large volume of air has a high evaporative effect upon the carrier liquid (usually water), and it is not unknown for all of the carrier liquid to be evaporated before the spray reaches the crop, so that the spray is relatively ineffective. As a specific example of a disadvantage of dilute solutions with a large capacity sprayer in continuous operation, it is not unknown for two tank trucks to be required in order to keep the sprayer fully supplied.

It has been shown that for maximum effectiveness the sprayed liquid should have a droplet size within a relatively restricted range. Thus, droplets of less than about 30 microns diameter have such high internal forces that they will not wet the surface on which they land, while droplets of greater than 100 microns diameter are inefficient in coating the sprayed surface since their volume is disproportionately high for the additional surface that they coat. An ideal spray therefore consists of droplets all within the range of about 50–60 microns diameter. It may be noted that with the known spraying machines described above the droplet size is much greater than this ideal size, within the range 500–600 microns.

SUMMARY OF THE INVENTION

It is an object of the invention to provide an agricultural liquid spraying machine of new form, the machine comprising a frame, a tank for spray liquid mounted by the frame for transport therewith, spray nozzle means mounted by the frame for producing a desired spray pattern of the liquid, means for supplying the liquid from the tank under pressure to the nozzle means and comprising pipe means connecting the tank interior and the spray nozzle means, air compressor means, and air supply pipe means connected between the air compressor means and the spray nozzle means for the supply of air under pressure to the spray nozzle means, said air supply pipe means comprising a tubular portion of the said frame.

It is another object of the invention to provide an agricultural liquid spraying machine comprising a frame mounted upon a pair of road wheels, a tank for spray liquid mounted by the frame for transport therewith, nozzle means mounted by the frame for producing a desired spray pattern of the liquid, air compressor means connected to the said nozzle means and supplying thereto air under such pressure and in such quantity as to produce from each spray nozzle of the said nozzle means an air flow having a velocity greater than 450 f.p.s., pipe means connecting the tank interior and the spray nozzle means for supplying the liquid from the tank under pressure to the nozzle means to entrain and atomise the spray liquid in the air flows therefrom, valve means in the said pipe means, and valve-operating means operable by said road wheels to open the said valve means only while the road wheels are rotating.

DESCRIPTION OF THE DRAWINGS

FIGURE 2 is a similar view of the same embodiment from the front and to the other side, FIGURE 4 is a schematic of an auxiliary hydraulic control circuit.

DESCRIPTION OF THE EMBODIMENTS

Figure 1:
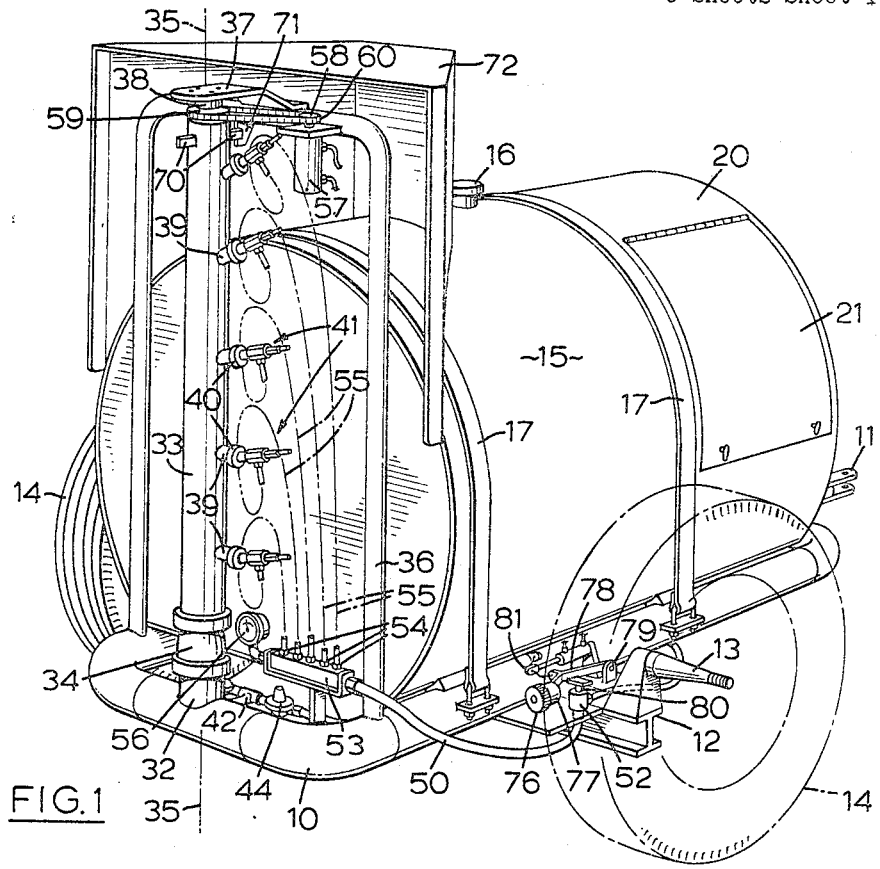
FIGURE 1 is a perspective view from the rear and to one side of a first embodiment, parts being broken away as necessary to show otherwise hidden parts.
Figure 3:
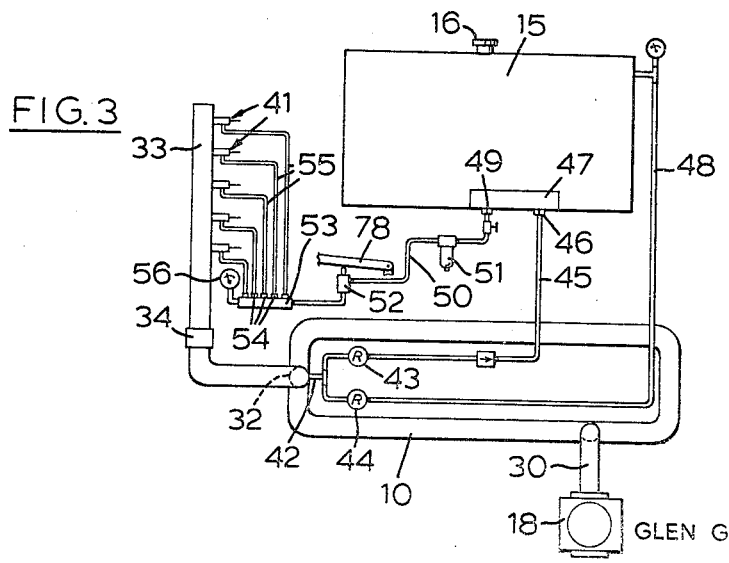
FIGURE 3 is a schematic of the spray generating portion of the machine.

The machine to be particularly described herein has the form of a trailer with its own road wheels, which can be towed by a conventional tractor and obtain the power for its operation from the usual rear power take-off thereof. In other embodiments which are not illustrated the machine has no wheels and is mounted on the rear hoist of the tractor, taking is power therefrom, or is a self-propelled, self-powered vehicle.

This embodiment comprises a frame 10 formed as an endless loop from large-internal-diameter tube, the loop being of generally oval form as seen in plan. A hitch 11 by which the trailer is connected to the tractor is fastened to one end of the loop, and a cross-bar 12 fastened near to the other end carries stub axles 13, upon which are mounted respectively a pair of conventional rubber-tired road wheels 14. A cylindrical supply tank 15 having a pressure-tight filling cap 16 is mounted on the rear of the frame and is fastened thereto by flexible straps 17 anchored at their ends to the frame. A high pressure (e.g. up to about 12 p.s.i.) rotary blower 18 of capacity about 600 c.f.m. is mounted at the frame front end by a suitable structure 19 and is enclosed in a protective casing 20 having two hinged access flaps 21. Power for the machine is obtained from the tractor rear power take-off (not shown) via a take-off shaft 22 and a universal joint 23, the latter being connected to a shaft 24 mounted in bearings 25, the shaft being in turn connected by pinions 26 and 27 and a chain 28 to the blower drive shaft 29. The compressed air supplied by the blower is fed via an outlet pipe 30 into the interior of the endless loop frame 10, the pipe including two rubber sleeves 31 to reduce as much as possible the transmission of vibrations from the blower to the rest of the machine.

The rear end of the frame 10 is provided with an upwardly extending T-junction 32, and a vertically-extending pipe 33 of the same diameter is mounted on the junction with a rotatable air-tight joint 34 between them, so that the pipe is rotatable about a verical axis 35. A vertically-extending inverted U-shaped frame 36 is rigidly connected to the trailer frame, and the cross bar of the frame has a bracket 37 carrying a thrust bearing 38 which supports the upper end of the rotatable pipe 33. A plurality of sideways-extending integral connections 39 are mounted on the pipe one above the other, each connection having a swivel joint 40 mounted thereon, each swivel joint in turn mounting a respective air-operated liquid-atomising nozzle 41. In this embodiment five such connections 39 are provided, the bottom two extending generally horizontally, while the other three extend at a progressively smaller angle to the vertical as one moves upward, such an arrangement being preferred in a machine intended for orchard spraying in order to obtain a desired spray pattern that will reach to the tops of the trees. The swivel joints 40 are provided for the same purpose, so that the nozzles can be set in the desired directions, and nozzles of different sizes may be employed, as will be discussed below.

It will be apparent that the interior of the frame serves as a plenum chamber for the compressor, and thereby assists in providing a smooth controllable flow of air to the vertically extending pipe and the respective nozzles, besides performing its usual purely mechanical function.

The frame is provided adjacent the T-junction 32 with another pair of T-junctions 42, by which compressed air is fed from the interior of the frame to two pressure regulators 43 and 44, these regulators being of any conventional type able to discharge the air received at a substantially constant pressure. The regulator 43 feeds air via a pipe 45 to the bottom of the interior of the tank 15, the pipe 45 being connected to a connection 46 in a removable floor plate 47 of the tank, and is operative to maintain the contents of the tank under the pressure set by the regulator; it will be noted that by supplying the air in this manner the regulator will automatically compensate for changes in the static head of the liquid in the tank as the latter is filled and emptied. The regulator 44 supplies the pressurized air via a pipe 48 to the top part of the tank, and its principal purpose is to pressurize the air space at the top of the tank as quickly as possible after start up of the blower compressor. As long as the compressor 18 is operating the interior of the tank is maintained under a substantially constant pressure set by the two regulators, and this pressure can be used to discharge the spraying liquid from the tank without the need for a separate pump.

Such an arrangement is particularly advantageous in that liquid pumps of corresponding high delivery pressure tend to require extensive maintenance, due to the poor operating conditions that are inevitable with an agricultural machine in normal use, and the corrosive effects of the solutions used. It will of course be understood that a separate liquid pump can be used if desired.

An outlet 49 for the pressurized liquid is mounted in the said removable plate 47 and is connected by a pipe 50 through a filter 51 and a valve 52 (whose function will be explained below) to a manifold 53 mounted on the frame at the rear of the tank. The liquid passes from the manifold through respective flow metering devices 54 (e.g. interchangeable fixed orifices) and thence via individual flexible pipes 55 to their respective nozzles 41. A conventional pressure gauge 56 is provided.

In this particular embodiment all of the nozzles 41 face in substantially the same general direction to one side of the machine, so that it will spray to only one side as it passes between the crop rows, but in other embodiments two sets of nozzles may be provided extending on opposite sides, so that both sides of the row can be sprayed at one time, but it will then be necessary to provide a correspondingly larger compressor to supply the additional air, and such an arrangement may require its own power supply, such as an internal combustion engine. I have found that the power for a single direction sprayer can be obtained from the power take-off of the usual medium size farm tractor (e.g. about 35–40 H.P.), while a dual direction machine requires the use of a heavy duty tractor (e.g. 50–60 H.P.), or a separate power supply.

In this particular embodiment therefore it is arranged that the direction of the spray pattern can be changed at the will of the operator, so that the machine can spray to one side or the other without having to reverse the direction of travel. To this end the vertical pipe 33 can be rotated when required by means of a small hydraulic motor 57 which is operatively connected by pinions 58 and 59 and a chain 60 to the rotatable pipe 33. Operating fluid under pressure is obtained from a conventional hydraulic circuit illustrated in FIGURE 4 and comprising a reservoir 61, pump 62, filter 63, hydraulic selector valve 64 and connecting pipes 65, the pump being driven from shaft 24 via pinions 66 and 67 and chain 68. The supply of liquid to the motor 57 is controlled by a hand lever 69 of the valve 64. In practice it is only necessary for the pipe 33 to rotate between two extreme positions, and these are set by diametrically opposed stops 70 on the pipe which alternatively engage an abutement 71 of the frame 36.

An upwardly-extending deflector 72 is fastened to the rear of the tank, this deflector diverging as seen in plan towards the rear of the machine and serving both to screen the driver from spray from the nozzles, and also to push aside tree branches that might otherwise damage the liquid spray means.

In prior art sprayers the spraying liquid is atomised by feeding it at very high pressure (e.g. about 400 p.s.i.) to nozzles intended to produce atomisation to the desired droplet size, the atomised liquid being entrained in a relatively large volume of low-pressure air. For example, in the spraying machine particularly described in my patent specification Ser. No. 3,227,376, issued Jan. 4, 1966, the air is fed at a rate of about 35–40,000 cubic feet per minute (c.f.m.), and a pressure of about 4 inches water gauge, which is equivalent to 0.015 pound per square inch (p.s.i.). The discharge velocity of this air in the neighbourhood of the nozzles is about 100–120 m.p.h. (about 140–180 feet per second, f.p.s.). The very highly pressurised liquid is supplied to the spray nozzles at about 10–20 gallons per minute, so that the most popular size of this machine, which has a tank capacity of about 300 gallons, can spray uninterruptedly for not more than about 15–30 minutes. It is found in practice that these machines cannot be used with concentrations of more than about 8 times normal without encountering the difficulty referred to above of excessive evaporation.

I have found some difficulty at the present time in obtaining a precise method of expressing solution concentrations in this field. Many different types of spray materials are used, and may of course be liquids or solids; they may also be single compounds or more or less complex mixtures. The operating instructions supplied by the manufacturer with the spray materials generally state the weight or volume that must be added to a predetermined volume of water to obtain a normal unit concentration; an eight times concentration is then obtained by adding eight times the unit quantity of spray material to the said predetermined volume of water. This arbitrary method of expressing concentration is well understood by those skilled in the art.

In machines in accordance with the present invention the air supplied to the spray nozzle means is of relatively high pressure and low volume and results in the formation of an air flow from the nozzle of velocity greater than about 450 f.p.s., and preferably in the range of about 600–900 f.p.s.

I have found that with an air flow of this minimum velocity the liquid can simply be discharged into the air flow and will be directly atomised thereby. Tests have shown that radial discharge of the liquid into the air flow will produce a spray that is acceptable for some purposes, but that more uniform droplet size, and more precise control thereof, is obtained by coaxial discharge of the liquid within the emerging air flow; a specific nozzle design for this purpose is described in detail below.

The required rates of flow of the air and liquid, and the preferred supply pressure of the air are, at least to some extent, interdependent upon one another, and also dependent upon factors such as the number of nozzles, the ground speed of the machine, and the spray rate required. The number and distribution of the nozzles will vary with the crop, comparatively few being required for low crops such as tomatoes and tobacco, more for medium height crops such as grapes, and the maximum for orchard trees. With the embodiment particularly described, which is intended for orchard spraying, and at air pressures of 3–6 p.s.i., the air flow volume can be less than about 1,000 c.f.m. (i.e. average 200 c.f.m. per nozzle), and preferably is within the range of about 300–750 c.f.m. (60–150 c.f.m. average per nozzle), excellent results being obtained with a volume in the neighbourhood of 600 c.f.m. A machine of the same type as that described, but adapted for orchard spraying simultaneously on two sides would require an air supply of twice these quantities. In this embodiment the air is supplied at about 5 p.s.i. and the internal pressure of the tank 15 is about 4 p.s.i., the difference being due to the regulators 43 and 44. Because of the effectiveness of the atomisation obtained the liquid flow rate can be less than about 4 gallons per minute, and the particular embodiment illustrated preferably is operated at about 2.2 gallons per minute, the tank having a capacity of 250 gallons to give a spraying period of about 2 hours with a single filling. Such a machine is able without difficulty to utilize solutions of about 20–30 times the said normal unit concentration.

Figure 5:
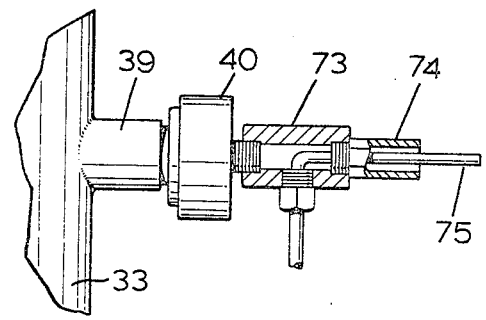
FIGURE 5 is a view to an enlarged scale of a particular form of a spraying nozzle.

Referring now to FIGURE 5, in a specific form of nozzle that has been found highly effective in this particular embodiment a connector 73 is screw-threaded onto the swivel point 40 and has an air discharge nozzle 74 screw-threaded therein. The connector also receives a side-entering liquid discharge pipe 75 which is supported by the connector coaxially within the nozzle bore with its end protruding beyond the nozzle end.

Each nozzle 74 protrudes about 2¾ inches from the respective connector; the three lower nozzles 74 have exit apertures of ¾ inch; the two upper nozzles 74 have exit apertures of 13/16 inch to give a poportionately greater air flow necessary to reach the top of the trees; all the nozzle bores have a standard Morse taper towards the exit of 2½°; each discharge pipe 75 is of 5/16 inch internal diameter. It is found that as the end of the pipe 75 approaches the nozzle exit the droplet diameter decreases correspondingly down to a certain limit and then increases again; the desired size of about 0–90 microns is usually obtained when the tube protrudes about 1–2 inches. The droplet diameter is also affected by the air pressure and in the range of pressures contemplated increase as the pressure is increased.

Despite the low volume of spray liquid it is found that the crop is coated effectively and evenly, due it is believed to most of the droplets being within the above-described most efficient size range. The very fine droplets have high internal forces which enables them to resist evaporation, and renders the spray highly stable until it deposits on the leaves. The use of high pressure in generating the air flow also assists in preventing evaporation, in that, at least in the initial stages of its travel, the air is cooled by adiabatic expansion and the droplets therefore move in a "microclimate" that is substantially cooler than the ambient atmosphere. Moreover, because of their small size, they have much less tendency to fall under gravity, so that they deposit more randomly on the crop and have a greater period during which they can contact and deposit on the leaves.

The use of an air flow of such high velocity also appears to result in the greater penetration of the tree by the spray, even when the foliage is relatively dense, which again assists in uniform spray coverage. The relatively high pressure of the emergent air flow may also assist in this regard, in that the flow of air which penetrates the outer foliage is still relatively compressed and expands within the tree canopy thereby distributing the entrained material.

Because of the high concentration of the spray liquid it is essential to avoid overspraying, since this can quite easily lead to damage or destruction of the crop, and to this end the valve 52 is controlled automatically to cut off the supply of liquid to the nozzles as long as the trailer wheels are not rotating. In this particular embodiment the safety control means comprises a wheel 76 which engages one of the trailer wheels 14 to be rotated thereby, and in turn rotates the drive shaft of a small hydraulic pump 77. The pump is mounted on an arm 78 pivoted at 79 to the frame member 12 and arranged to resiliently press the wheel 76 into contact with the road wheel. The pump operates against a loaded valve and thereby applies a permanent drag on the wheel 76, as a result of which even a slow rotation (1—1½ m.p.h.) of the wheel 14 causes the arm 78 to move upwards about the pivot 79. Valve 52 has its operating shaft 80 spring-biased to the open position and closable by the weight of the wheel 76, pump 77, and arm 78 thereon. A small rotation of the wheel 14 lifts the arm 78 sufficiently to open the valve, and the arm drops to close the valve as soon as the wheel 14 stops again. This system is found to be highly effective at the very low speeds of rotation of the wheels 14 encountered in usual spraying practice. For other times when operation is not required the wheel 76 is retracted from the trailer wheel, as illustrated in FIGURE 4, by means of a hydraulic strut 81 controlled via a locking valve 82 from the selector 64 by movement of the control handle 83. Movement of the strut piston in the direction of the respective arrow moves the arm 78 in the direction of the respective arrow against its own resilience while permitting it to hold the valve closed.

The other usual controls and gauges for the machine are mounted at the front of the trailer, but are not illustrated herein. Owing to the concentrated nature of the spray solution and to the long spraying period obtainable, it is desirable to provide an agitator within the tank, and in this embodiment this comprises a shaft 84 rotatably mounted in the interior of the tank and having agitator blades 85 fixed thereon; the shaft 84 is driven by means of pinions 86 and 87 and a chain 88 from the shaft 22.

Figure 6:
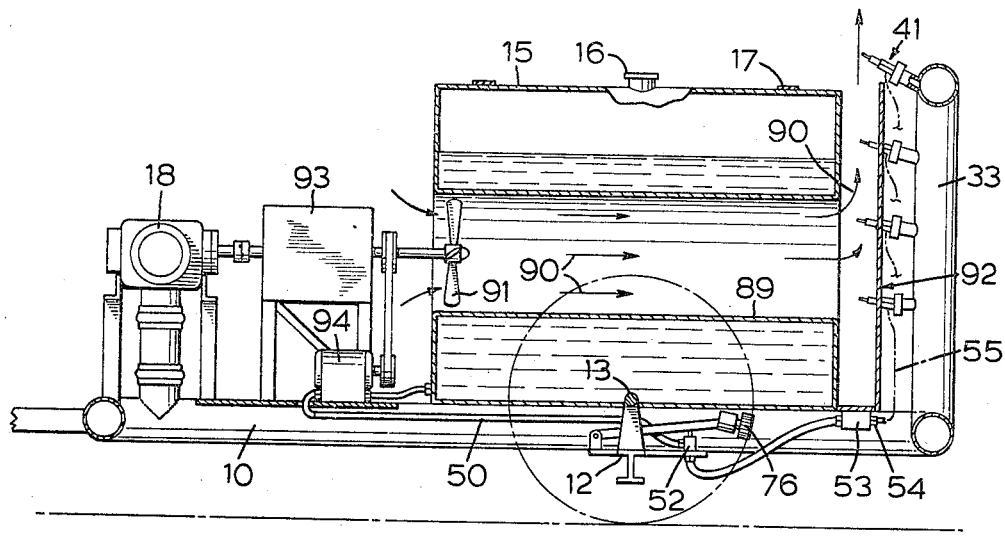
FIGURE 6 is a schematic similar to FIGURE 3 of another embodiment.

The present invention can also with advantage be applied to known spraying machines, such as those referred to above, and FIGURE 6 shows schematically one way in which the invention can be applied to the sprayer disclosed in my patent specification Ser. No. 3,227,376 referred to above. Similar parts are given the same reference as in the previous figures.

In this embodiment the tank 15 has a longitudinal central tunnel 89 and a large-volume low-pressure secondary flow of air, indicated by the arrows 90, is produced by a fan 91 at the front end of the tunnel. The air stream emerging from the tunnel is directed radially outward by a director plate indicated generally by 92. The fan is driven by an engine 93 mounted on the frame 10, the engine also driving the compressor 18 and a low pressure liquid pump 94 (e.g. about 10 p.s.i. output pressure instead of the 400 p.s.i. pump previously used). The air from the compressor is fed via the frame 10 to the pipe 33, which is in this embodiment of the same general shape as the periphery of the plate 92. The nozzles 41 are disposed in a predetermined pattern around the pipe 33 and discharge into the air stream 90. The spray liquid is fed via the pipe 50 and valve 52 to the manifold 53 and thence to the nozzles 41.

Such an embodiment has application where the use of higher concentrations of solution is not required, but still gives efficient and highly effective atomisation of the liquid to droplets predominantly of the desired size range. Since the air from the compressor predominantly produces liquid atomisation the capacity of the pump 18 can be smaller than is required for the first-described type of embodiment.

It will be seen that I have provided a new form of spraying machine wherein atomisation of the desired type can readily be obtained and/or use can readily be made of more highly concentrated sprays than has been commercially feasible hitherto. In such a machine the air producing the atomisation can serve as the sole propelling medium for carrying and directing the spray to the crop, or it can be supplemented by a higher volume, lower velocity air flow. I have also provided a new nozzle construction for the production of atomised liquid spray, a new sprayer frame construction applicable to any spray machine in which high pressure air must be conveyed from one part of the frame to another, and a new form of sprayer cut-off device applicable to any spray machine for controlling the liquid flow, the device being effective at the low ground speeds at which spraying machines are operated.

What I claim is:

1. An agricultural spraying machine comprising a frame mounted upon a pair of road wheels, a tank for spray liquid mounted by the frame for transport therewith, nozzle means mounted by the frame for producing a desired spray pattern of the liquid, air compressor means connected to the said nozzle means and supplying thereto air under such pressure and in such quantity as to produce from each spray nozzle of the said nozzle means an air flow having a velocity greater than 450 f.p.s., pipe means connecting the tank interior and the spray nozzle means for supplying the liquid from the tank under pressure to the nozzle means to entrain and atomise the spray liquid in the air flows therefrom, valve means in the said pipe means, and valve-operating means operable by said road wheels to open the said valve means only while the road wheels are rotating.

2. The invention as claimed in claim 1, characterised in that the said frame includes a tubular portion constituting air supply pipe means connecting the said air compressor means and the spray nozzle means.

3. The invention as claimed in claim 2, characterised in that the said frame includes a tubular endless loop portion constituting the said air supply pipe connecting means and a plenum chamber for the said air compressor means.

4. An agricultural spraying machine comprising a frame, a tank for spray liquid mounted by the frame for transport therewith, spray nozzle means mounted by the frame for producing a desired spray pattern of the liquid, means for supplying the liquid from the tank under pressure to the nozzle means and comprising pipe means connecting the tank interior and the spray nozzle means, air compressor means, and air supply pipe means connected between the air compressor means and the spray nozzle means for the supply of air under pressure to the spray nozzle means, said air supply pipe means comprising a tubular portion of the said frame.

5. The invention as claimed in claim 4, wherein the said air compressor means supplies air to the spray nozzle means so as to produce from each nozzle an air flow having a volume of from about 60 to about 200 c.f.m., a pressure of from 3 to 6 p.s.i., and a velocity greater than 450 f.p.s., and wherein the said frame includes a tubular endless loop portion consituting the said air supply pipe connecting means and a plenum chamber for the said air compressor means.

6. The invention as claimed in claim 4, characterised in that the said frame includes a tubular endless loop portion constituting the said air supply pipe connecting means and a plenum chamber for the said air compressor means.

References Cited

UNITED STATES PATENTS

| | | | |
|---|---|---|---|
| Re 22,039 | 2/1942 | Vaage | 239—160 X |
| 2,356,950 | 8/1944 | Root | 239—77 |
| 2,363,776 | 11/1944 | Dale | 239—160 X |
| 2,432,309 | 12/1947 | Gore | 239—164 |
| 3,233,832 | 2/1966 | Hallberg | 239—159 X |
| 2,012,973 | 9/1935 | Parker | 239—77 |
| 2,708,596 | 5/1955 | Weller | 239—77 |
| 2,959,214 | 11/1960 | Durr et al. | 239—77 |
| 3,339,846 | 9/1967 | Guetet | 239—77 |

EVERETT W. KIRBY, Primary Examiner

U.S. Cl. X.R.

239—156, 159